(12) United States Patent
Ple (10) Patent No.: US 8,689,496 B2
(45) Date of Patent: Apr. 8, 2014

(54) FRANGIBLE HINGE MECHANISM FOR A PLATFORM PARTITION, ASSOCIATED PARTITION, ASSEMBLY AND METHOD

(75) Inventor: Michael Ple, Issy les Moulineaux (FR)

(73) Assignee: Dassault Aviation (FR)

(*) Notice: Subject to any disclaimer, the term of this patent is extended or adjusted under 35 U.S.C. 154(b) by 94 days.

(21) Appl. No.: 13/554,526

(22) Filed: Jul. 20, 2012

(65) Prior Publication Data

US 2013/0020369 A1 Jan. 24, 2013

(30) Foreign Application Priority Data

Jul. 22, 2011 (FR) .................................... 11 02296

(51) Int. Cl.
*E04B 1/00* (2006.01)
*E04C 1/00* (2006.01)

(52) U.S. Cl.
USPC ............. 52/98; 52/238.1; 52/745.15; 16/222; 16/366; 49/142; 49/163; 244/129.5

(58) Field of Classification Search
USPC .......... 52/98–100, 71, 238.1, 745.15; 16/222, 16/366–370; 49/98, 142, 143, 163, 188; 244/129.5, 118.5, 129.4
See application file for complete search history.

(56) References Cited

U.S. PATENT DOCUMENTS

| 7,802,345 B2 * | 9/2010 | Mathew et al. ................ 16/370 |
| 8,038,100 B2 * | 10/2011 | Osborne et al. ............. 244/129.5 |
| 2003/0080249 A1 * | 5/2003 | Raczkowski ............... 244/118.5 |
| 2003/0189130 A1 * | 10/2003 | Dovey et al. ............... 244/118.5 |
| 2004/0173327 A1 | 9/2004 | Steel et al. |
| 2009/0188081 A1 * | 7/2009 | Mathew et al. ................. 16/370 |

FOREIGN PATENT DOCUMENTS

NL 1027177 C2 4/2006

OTHER PUBLICATIONS

Search Report issued on Mar. 23, 2012 for French Application No. FR1102296.

* cited by examiner

*Primary Examiner* — Brian Glessner
*Assistant Examiner* — Brian D Mattei
(74) *Attorney, Agent, or Firm* — Knobbe Martens Olson & Bear LLP (57) ABSTRACT

A mechanism including a hinge and movement assembly having a first fastening region, a second fastening region, and a hinge defining an axis of rotation of the second fastening region relative to the first fastening region is provided. The mechanism further comprises an assembly for maintaining a releasable portion of the partition relative to a stationary portion of the partition, the maintenance assembly having at least one frangible connection that can be broken to rotationally free the second fastening region relative to the first fastening region. The hinge and movement assembly includes relative movement means for the second fastening region relative to the first fastening region at least in a direction parallel to the axis of rotation.

19 Claims, 9 Drawing Sheets

FRANGIBLE HINGE MECHANISM FOR A PLATFORM PARTITION, ASSOCIATED PARTITION, ASSEMBLY AND METHOD

CROSS-REFERENCE TO RELATED APPLICATIONS

This application claims the benefit of French Application No. 11 02296 filed Jul. 22, 2011, which is hereby expressly incorporated by reference in its entirety.

BACKGROUND OF THE INVENTION

1. Field of the Invention

The present invention relates to a frangible hinge mechanism for a partition of a platform, comprising:
- a hinge and movement assembly including a first fastening region for fastening on a stationary portion of the partition, a second fastening region for fastening on a releasable portion of the partition, and a hinge connecting the first fastening region to the second fastening region, the hinge defining an axis of rotation of the second fastening region relative to the first fastening region; and
- an assembly for maintaining the releasable portion of the partition relative to the stationary portion of the partition, the maintenance assembly including at least one frangible connection that may be broken to rotatably release the second fastening region relative to the first fastening region.

Such a mechanism is designed to be mounted on a partition arranged in the cabin of a civil or military aircraft transporting passengers and/or good. The partition is advantageously designed to form a door leaf separating two compartments in the cabin.

2. Description of the Related Art

To delimit the separate compartments in the cabin of an aircraft, it is known to position a separating assembly having two stationary partitions delimiting a central circulation passage between the compartments.

The separating assembly also includes at least one leaf movable relative to the stationary partitions between a configuration covering the circulation passage, in which the two compartments are isolated, and a passage configuration, in which the two compartments communicate.

One known separating assembly is for example positioned in certain business airplanes of the Falcon® type. This assembly includes a leaf formed by a door transversely movable relative to a stationary partition. An opening mechanism makes it possible to open the door. Such an assembly is satisfactory in the case of normal use of the aircraft.

However, in case of emergency, aeronautics standards require that the airplane be evacuated under all circumstances. This is in particular applicable when the opening mechanism of the leaf is faulty and the leaf remains jammed in the circulation passage. To allow this opening, the leaf sometimes comprises at least one releasable portion that can be separated from a stationary portion by applying an axial force, so as to free the circulation passage.

To that end, it is known to position a frangible hinge along a vertical pin in the vicinity of one of the lateral edges of the leaf. This hinge allows part of the leaf to be released under the effect of bearing on that portion by an occupant of the aircraft.

The frangible hinge extends between the stationary portion and the releasable portion. At least one frangible connection keeps the hinge rotationally immobile during normal operation.

When a force is applied along the circulation axis, the frangible connection breaks, rotationally releasing the hinge and allowing the releasable portion to pivot relative to the stationary portion.

Such a separating assembly is not fully satisfactory. In fact, the known frangible hinge mechanisms are quite often complex and tedious to maintain (in particular to replace the frangible portions of the mechanism). Furthermore, in the case of a door centered on the axis of the aircraft, the rotational travel of the releasable portion may be hindered by the fuselage of the airplane, in particular when said fuselage has a relatively small curve radius.

SUMMARY OF THE INVENTION

One aim of the invention is therefore to obtain a frangible hinge mechanism for an aircraft partition, which is adapted to any positioning of the partition in the aircraft, and in particular a partition situated at the center of the aircraft.

Another aim of the invention is to obtain a hinge mechanism that is easy to manufacture and maintain, and which has a light structure.

To that end, the invention relates to a mechanism of the aforementioned type, characterized in that the hinge and movement assembly includes means for the relative movement of the second fastening region relative to the first fastening region at least in a direction parallel to the axis of rotation.

The mechanism according to the invention may comprise one or more of the following features, considered alone or according to any technically possible combinations:
- the relative movement means can allow movement of the second fastening region relative to the first fastening region along an axis perpendicular to the axis of rotation, so as to move the second fastening region away from the first fastening region.
- the relative movement means guide the movement of the second fastening region relative to the first fastening region between a maintenance configuration and a separated configuration, the hinge and movement assembly comprising means for blocking the movement of the second fastening region relative to the first fastening region in the separated configuration.
- in the separated configuration, the second fastening region extends in a position situated at least partially below the position that second fastening region occupies in the maintenance configuration.
- in the separated configuration, the blocking means keep the axis of rotation vertical;
- the relative movement means include at least one first connecting rod, advantageously a pair of first connecting rods, each first connecting rod connecting one of the first fastening region and the second fastening region to the hinge, the first connecting rod being hinged at the first point on one of the first fastening region and the second fastening region, and a second point on the hinge.
- It includes at least one second connecting rod connecting the other of the first fastening region and the second fastening region to the hinge, the second connecting rod being hinged at a first point on the other of the first fastening region and the second fastening region, and a second point on hinge.
- the second fastening region is movable relative to the first fastening region between a maintenance configuration and a separated configuration, and, in the separated configuration, the or each first connecting rod and the second connecting rod are parallel or aligned, advantageously along an axis perpendicular to the axis of rotation.

the frangible maintenance assembly comprises a first part intended to be fastened on the stationary portion and a second part intended to be fastened on the releasable portion, the frangible connection advantageously having a frangible fastening member connecting the first part and the second part.

the frangible connection can be broken by applying a calibrated pulling force.

The invention also relates to a platform partition, characterized in that it includes a stationary portion, a releasable portion relative to the stationary portion, and a mechanism as described above, the first fastening region being fastened on the stationary portion, the second fastening region being fastened on the releasable portion, the frangible maintenance assembly connecting the stationary portion to the releasable portion.

The partition according to the invention may comprise one or more of the following features, considered alone or according to all technically possible combinations:

after the frangible connection is broken, the releasable portion can be moved downward relative to the stationary portion by means of the relative movement means.

It includes an additional releasable portion, the releasable portion being able to slide relative to the additional releasable portion parallel to the axis of rotation after the frangible connection is broken.

The invention also relates to a separating assembly for a platform, of the type having a stationary partition delimiting a circulation passage extending along a circulation axis and at least one partition transversely movable relative to the circulation axis between a configuration freeing the passage and a configuration blocking the passage, the movable partition being as defined above.

The separating assembly according to the invention may comprise one or more of the following features, considered alone or according to any technically possible combinations:

it includes a first stationary partition and a second stationary partition situated on either side of the circulation passage, the assembly including a first movable partition that can be moved relative to the first stationary partition and a second movable partition that can be moved relative to the second stationary partition between a configuration freeing the passage and a configuration blocking the passage, at least one, advantageously both movable partitions being as defined above.

The invention also relates to a method for opening a platform partition, comprising the following steps:

providing a partition as defined above;

breaking the frangible connection to release the releasable portion relative to the stationary portion;

moving the releasable portion relative to the stationary portion in at least one direction parallel to the axis of rotation by means of the relative movement means;

pivoting the releasable portion relative to the stationary portion around the axis of rotation.

BRIEF DESCRIPTION OF THE DRAWINGS

The invention will be better understood upon reading the following description, provided solely as an example, and done in reference to the appended drawings, in which.

DETAILED DESCRIPTION OF CERTAIN ILLUSTRATIVE EMBODIMENTS

Figure 1:
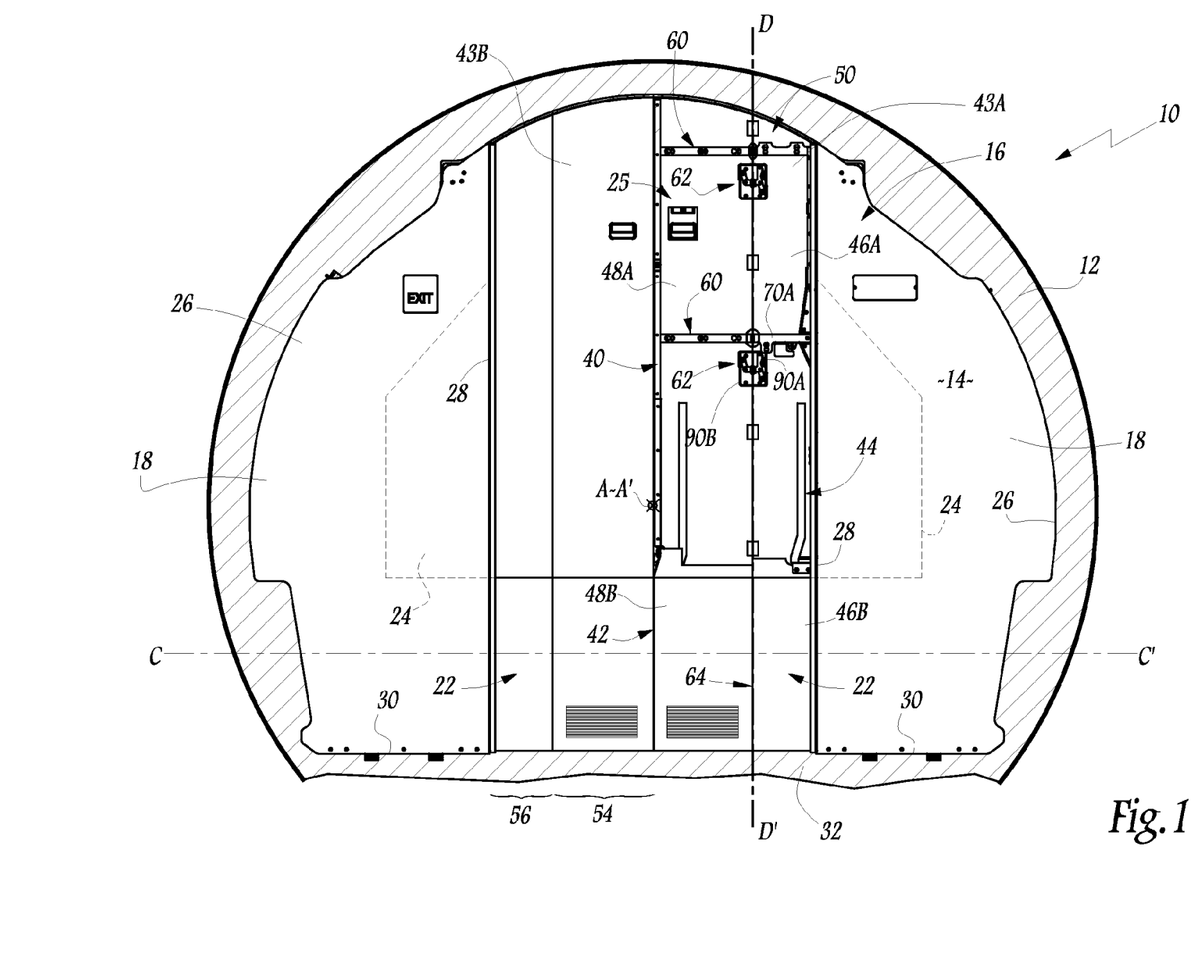
FIG. 1 is a front view of a first separating assembly including a frangible hinge mechanism according to the invention.

A first aircraft 10 according to the invention is partially illustrated in FIG. 1.

In a known manner, the aircraft 10 is a platform having a fuselage 12 diagrammatically shown in FIG. 1. The fuselage 12 delimits an inner space 14 intended to receive occupants and/or goods. The inner space 14 is for example a cabin or a cargo compartment of the aircraft.

The fuselage 12 extends along a central longitudinal axis A-A' of the aircraft 10, shown horizontally in FIG. 1.

According to the invention, the aircraft 10 includes a separating assembly 16 according to the invention, delimiting two compartments in the inner space 14. In this example, the separating assembly 16 extends transversely relative to the longitudinal axis A-A'.

Figure 2:
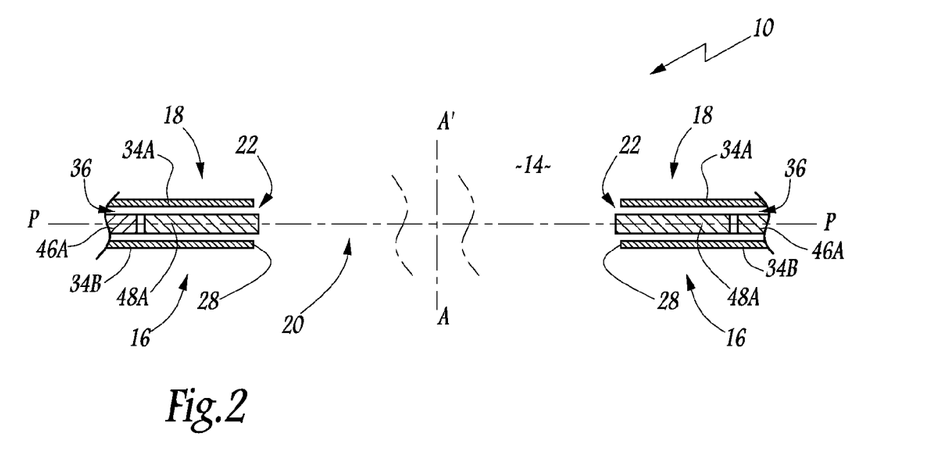
FIG. 2 is a cross-sectional view along a horizontal plane of the separating assembly of FIG. 1, in a configuration delimiting a circulation passage, the circulation passage having been cleared.

As illustrated by FIGS. 1 and 2, the separating assembly 16 comprises at least one stationary partition 18. The stationary partition 18 delimits an inner circulation passage 20 within the inner space (FIG. 2). The passage 20 extends along the longitudinal axis A-A' of the aircraft 10.

The separating assembly 16 also includes at least one movable partition 22 intended to selectively block the circulation passage 20. The partition 22 is movably mounted relative to the stationary partition 18, by means of a mechanism 24 for moving the movable partition 22 relative to the stationary partition 18, shown in broken lines in FIG. 1.

In the example illustrated in FIG. 1, the separating assembly 16 comprises two opposite stationary partitions 18, situated on either side of the fuselage 12. For each stationary partition 18, the separating assembly 16 has a movable partition 22 that can be moved by means of a movement mechanism 24 between a configuration blocking the passage, shown in FIG. 1, and a configuration freeing the passage 20, shown in FIG. 2.

The separating assembly 16 also includes an assembly 25 for releasably locking the movable partition 22 in the blocking configuration thereof.

The two movable partitions 22 thus form a central door of the separating assembly 16.

Each stationary partition 18 extends transversely in the inner space 14 between an outer edge 26 secured on the fuselage 12 and an inner edge 28 delimiting the circulation passage 20.

Each stationary partition 18 also has a lower edge 30 fastened on a horizontal floor 32 of the aircraft 10.

The outer lateral edge 26 has a curved shape complementary to that of the fuselage 12 on which is fastened. It substantially blocks the inner space 14.

In this example, the inner edge 28 of each stationary partition 18 extends vertically.

As illustrated by FIG. 2, each stationary partition 18 extends substantially in a transverse plane P relative to the axis A-A', advantageously perpendicular to the axis A-A'.

Each stationary partition 18 includes two opposite parallel walls 34A, 34B delimiting a housing 36 between them for receiving the movable partition 22 in the configuration thereof freeing the passage 20. The receiving housing 36 emerges inwardly toward the axis A-A' in the circulation passage 20.

In this example, each movable partition 22 includes at least one panel 40, 42. Each panel 40, 42 comprises an inner support filler 43A visible on the right in FIG. 1, and an outer filler 43B, visible on the left FIG. 1.

In this example, the mobile partition 22 includes an upper panel 40, laterally and vertically movable relative to the stationary partition 18, and a lower panel 42 movable only laterally relative to the stationary partition 18. The movable partition 22 also has a mechanism 44 for guiding the relative vertical movement of the upper panel 40 relative to the lower panel 42, which will not be described in more detail.

According to the invention, the movable partition 22 is at least partially frangible to allow the partial release of the circulation passage 20 in case of emergency, for example in the event the movable partition 22 is blocked in the configuration thereof blocking the passage 20.

To that end, each panel 40, 42 has an outer stationary portion 46A, 46B, a releasable inner portion 48A, 48B, and a frangible hinge mechanism 50 according to the invention connecting at least one stationary portion 46A, 46B to a releasable portion 48A, 48B.

In the example illustrated in FIG. 1, the upper panel 40 has an upper stationary portion 46A, and an upper releasable portion 48A connected to the stationary portion 46A by the mechanism 50.

The upper panel 40 has a height, considered perpendicular to the central axis A-A', larger than that of the lower panel 42.

Furthermore, the width of the upper stationary portion 46A is smaller than the width of the upper releasable portion 48A. The width of the upper releasable portion 48A is for example greater than 15 cm and preferably approximately 25 cm, to free a sufficient opening in the central passage 20 in case of emergency.

The lower panel 42 has a lower stationary portion 46B and a lower releasable portion 48B that have a width respectively corresponding to the width of the upper stationary portion 46A and the width of the upper releasable portion 48A.

The upper panel 40 inwardly delimits a housing 52 (FIG. 8) for partial retraction of the lower panel 42. This housing 52 opens downwardly.

When the movable partition 22 goes from its configuration blocking the passage to its configuration freeing the passage, the lower panel 42 is movable exclusively in translation along the horizontal axis C-C', between a position deployed outside the receiving housing 36 formed in the partition 18 and a position retracted in that housing 36.

Upon normal opening of the movable partition 22, which is done during normal operation by means of the movement mechanism 24, the upper panel 40 can be moved simultaneously following a transverse movement parallel to the axis C-C' and following a vertical downward movement to partially receive a lower panel 42 in the retraction housing 52 and to retract into the receiving housing 36 of the partition 18.

As will be seen below, in case of emergency, it is also possible to partially open the passage 20 by freeing the frangible hinge mechanism 50. Each releasable portion 48A, 48B can then be rotated around a vertical hinge axis D-D' (FIG. 9) relative to each stationary portion 46A, 46B, between the configuration blocking the passage 20, shown in FIG. 7, and a longitudinal configuration partially opening the passage 20, shown in FIGS. 8 and 9.

Figure 7:
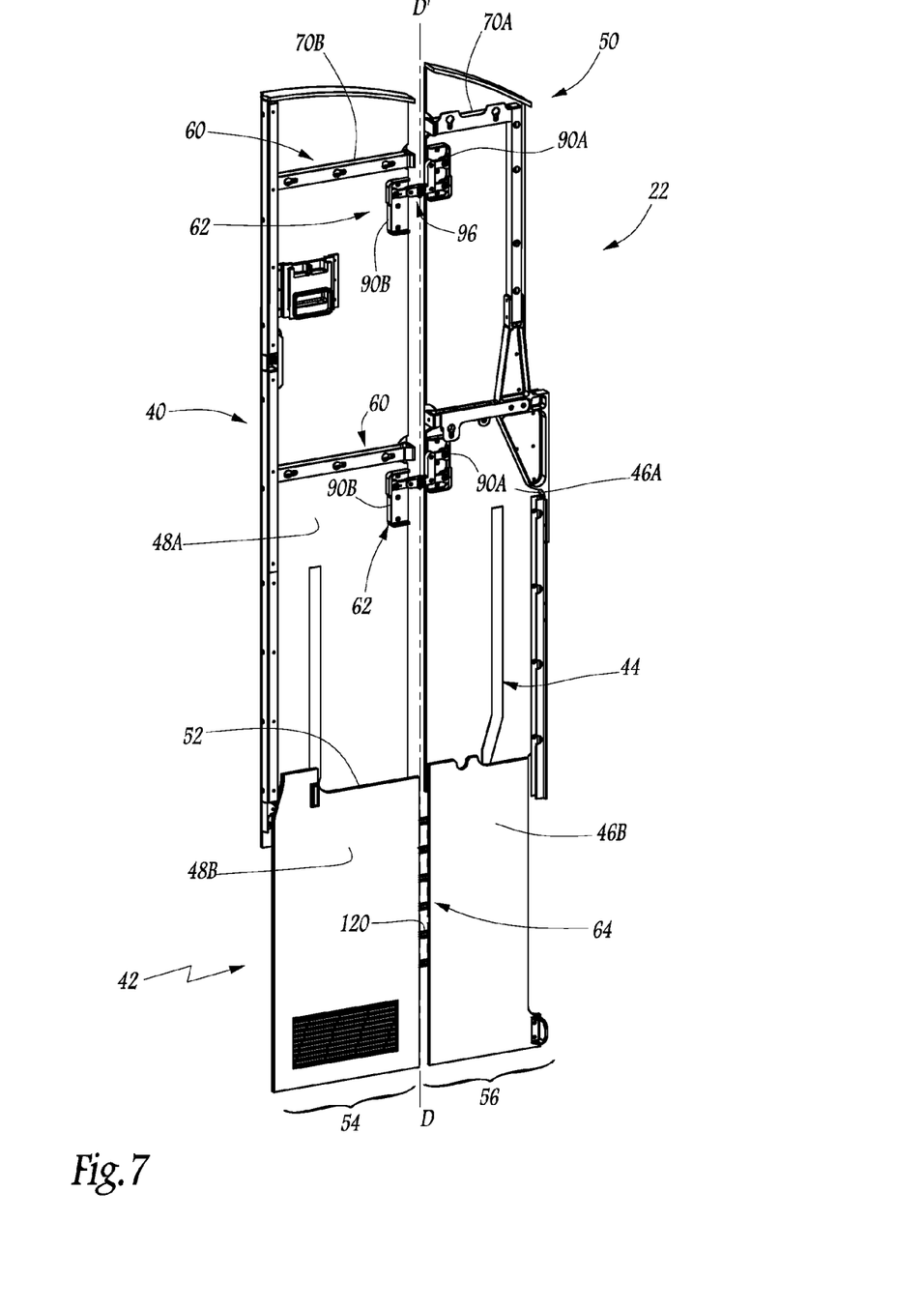
FIG. 7 is a three-quarters front perspective view of a partition of the assembly of FIG. 1, a releasable portion of the partition having been freed.
Figure 8:
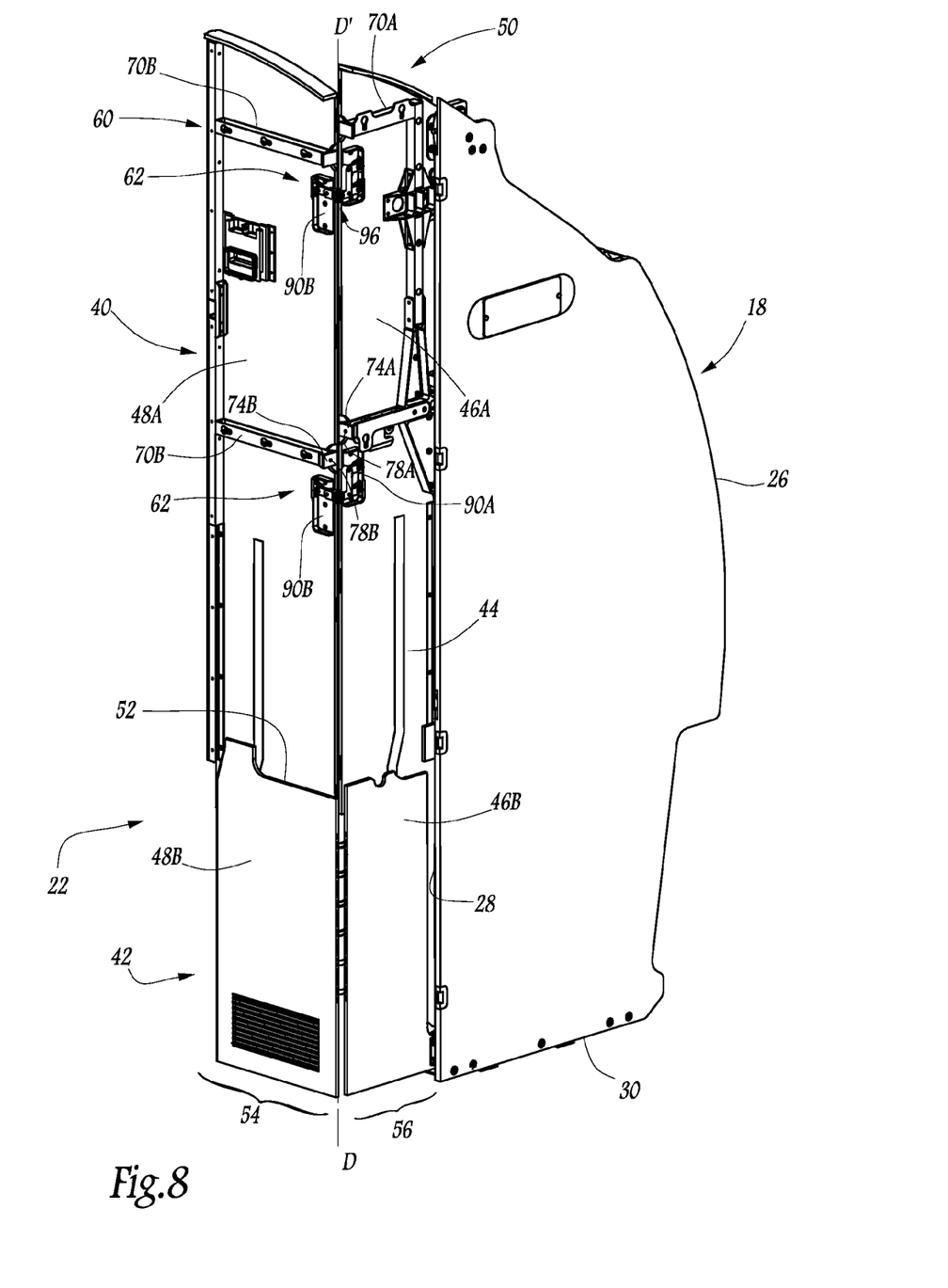
FIG. 8 is a view similar to FIG. 7, the releasable portion having been pivoted.

The releasable portions 48A, 48B thus form a releasable half-panel 54 visible in FIG. 7 and FIG. 8. The releasable half-panel 54 can be rotated around a vertical axis D-D' relative to a stationary half-panel 36 formed by the stationary portions 46A, 46B.

According to the invention, the hinge mechanism 50 includes at least one frangible maintenance assembly 60 for maintaining a releasable portion 48A relative to a stationary portion 46A and at least one movement and hinge assembly 62 of the releasable portions 48A relative to the stationary portion 46A.

The mechanism 50 also advantageously includes deformable connecting means 64 between the lower stationary portion 46B and the lower releasable portion 48B (for example, springs).

In the example illustrated in FIG. 1, the frangible hinge mechanism 50 includes two pairs of assemblies 60, 62 vertically spaced along the upper panel 40.

Figure 5:
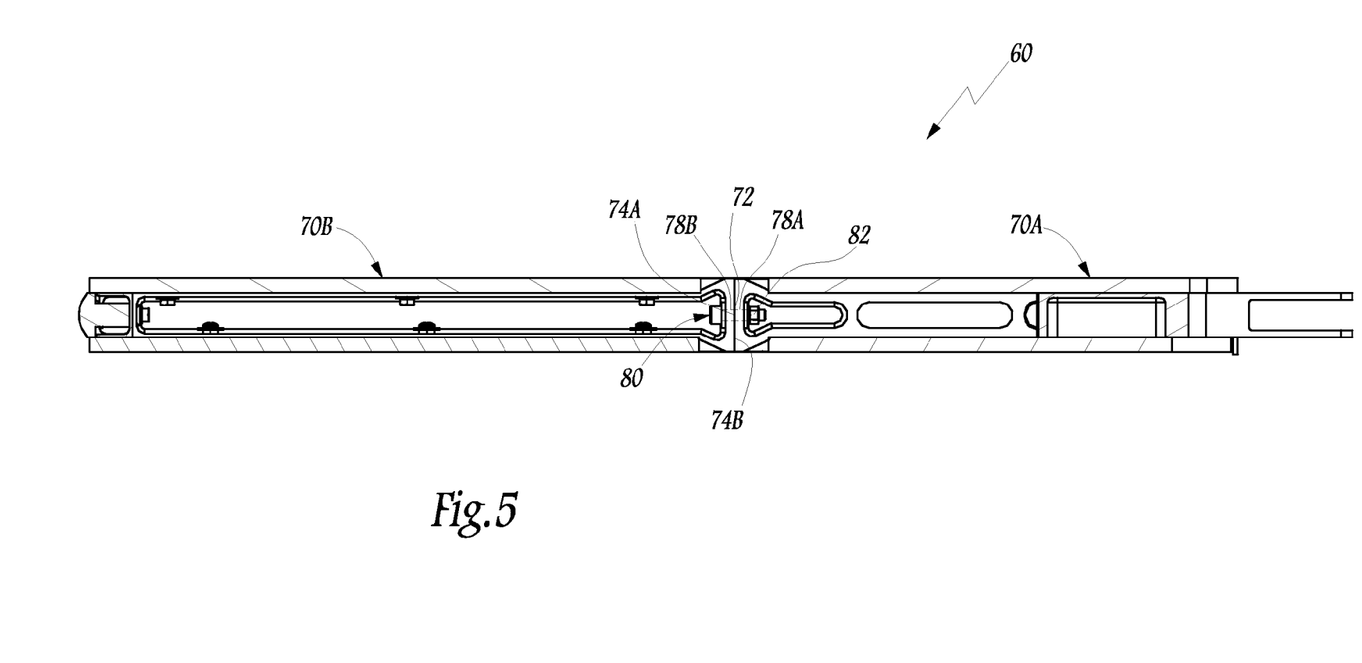
FIG. 5 is a cross-sectional view along a horizontal plane of a frangible maintenance assembly of the hinge mechanism FIG. 1.
Figure 6:
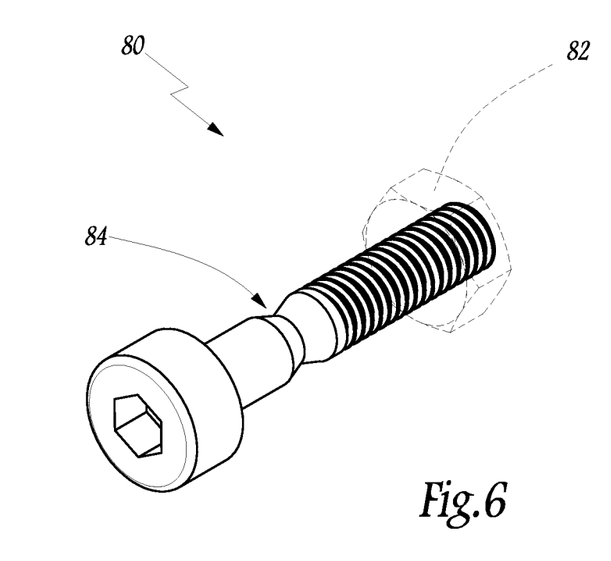
FIG. 6 is a three-quarters front perspective view of a frangible connecting member for the maintenance assembly of FIG. 5.

As illustrated by FIGS. 1, 5 and 6, each frangible maintenance assembly 60 comprises a first piece 70A secured to the stationary portion 46A, a second piece 70B secured to the releasable portion 48A, and a frangible link 72 between the pieces 70A, 70B.

In the example illustrated in these figures, each piece 70A, 70B is formed by a horizontal beam respectively attached on the stationary portion 46A and on the releasable portion 48B. The beams are open-worked.

Each piece 70A, 70B has an end surface 74A, 74B on the edge thereof. The end surface 74A of the first piece 70A is intended to be placed in contact with the end surface 74B of the second corresponding piece 70B situated facing it.

Each piece 70A, 70B delimits a passage opening 78A, 78B for the frangible link 72 through the end surface 74A, 74B.

When the maintenance assembly 60 is active, the end surface 74B of the piece 70B is pressed on the end surface 74A of the piece 70A. The surfaces 74A, 74B are kept in contact with one another by means of the frangible link 72.

On the contrary, when the frangible link 72 is broken, the maintenance assembly 60 is inactive, and the surfaces 74A, 74B may move away from one another, as shown in FIG. 7.

In the example illustrated in FIG. 6, the frangible link 72 has a fusible connecting member 80 and a retaining member 82 for retaining the connecting member 80. In this example, the connecting member 80 is made up of a screw.

The connecting member 80 has a calibrated thin zone 84 that may be broken under the application of a predetermined pulling force.

The thin zone 84 is advantageously positioned at the contact zone of the end surfaces 74A, 74B. It is for example formed by an annular constriction.

The thin zone 84 is broken when a calibrated pulling force is applied between the pieces 70A, 70B to cause the connecting member 80 to break.

This pulling force may in particular result in a thrust above a given value, for example greater than 20 kg, exerted by a passenger on the releasable portion 48A along the axis A-A'.

The connecting member 80 is inserted through the passages 78A, 78B and is maintained in the passages 78A, 78B by the retaining member 82.

The retaining member 82 is for example a nut.

Figure 3:
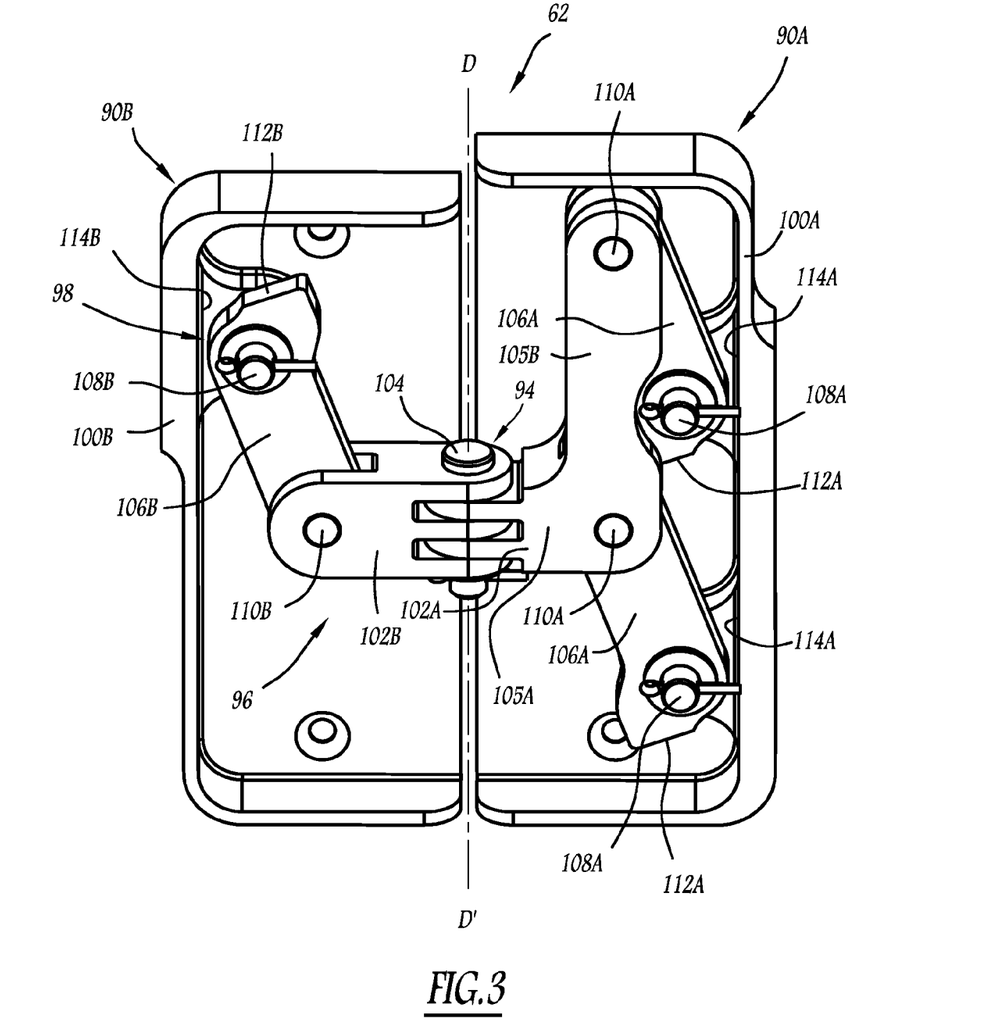
FIG. 3 is a front perspective view of a portion of the frangible hinge mechanism according to the invention, in a maintenance configuration of the mechanism.
Figure 4:
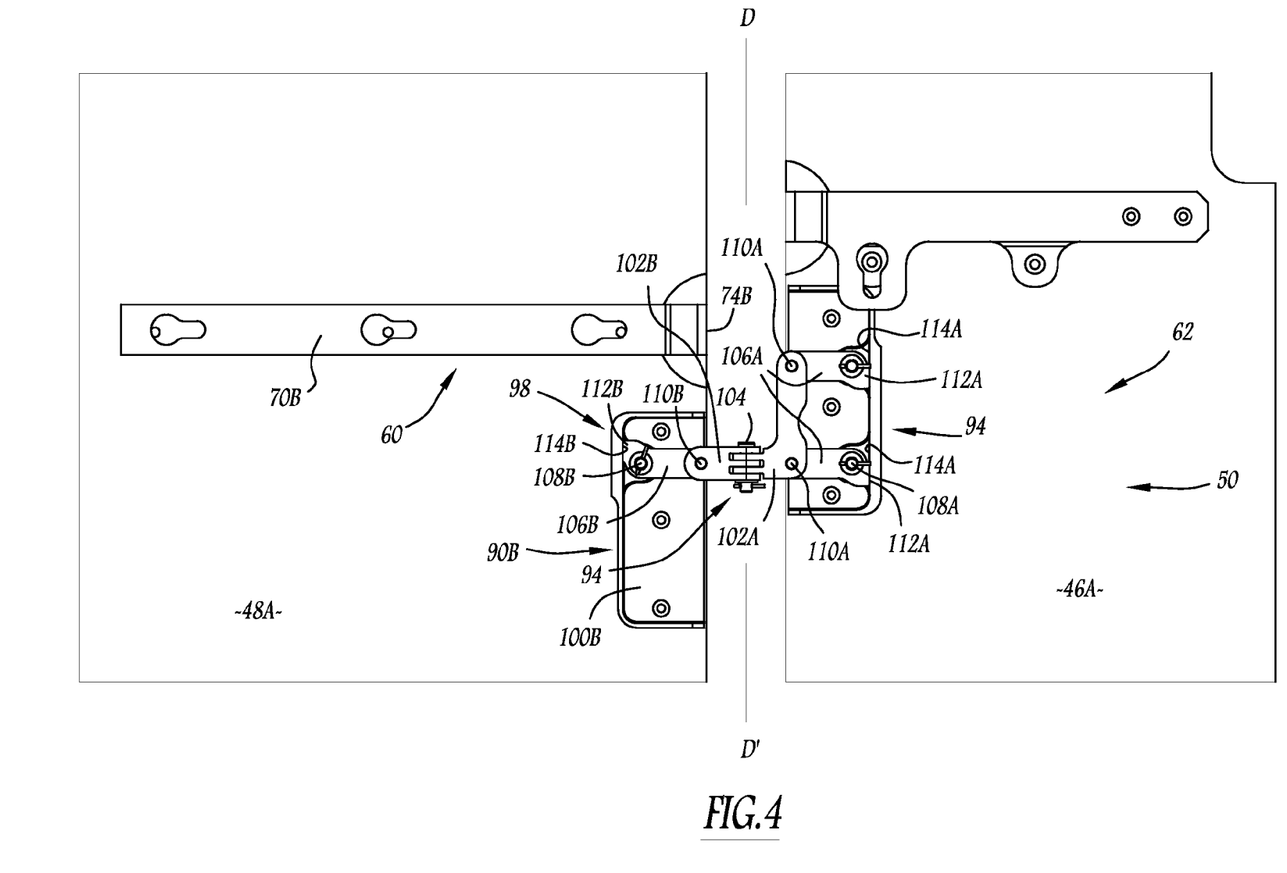
FIG. 4 is a view similar to FIG. 3, in a separated configuration of the mechanism, in which a releasable portion of a movable separating partition has been moved.

In the example, the hinge and movement assembly 62 illustrated in FIGS. 3 and 4 is positioned completely spaced away from the frangible maintenance assembly 60, for example above or below the frangible maintenance assembly 60.

The hinge and movement assembly 62 includes a first fastening region 90A on the stationary portion 46A, a second fastening region 90B on the releasable portion 48A, and a central hinge 94.

According to the invention, the hinge and movement assembly 62 also includes guide means 96 capable of allowing a relative movement of the second fastening region 90B relative to the first fastening region 90A following a composite movement including at least one first movement along the axis of rotation D-D' defined by the hinge 94 and, advantageously, a second movement perpendicular to the axis D-D'.

Advantageously, the hinge and guiding assembly 62 also includes blocking means 98 situated at each of the regions 90A, 90B and capable of blocking the travel of the second fastening region 90B relative to the first fastening region 90A in a predetermined position illustrated in FIG. 4.

The first fastening region 90A and the second fastening region 90B are each made up of a platen 100A, 100B respectively fastened on the stationary portion 46A and on the releasable portion 48A.

The hinge 94 includes a first fork 102A and a second fork 102B engaged in one another and a vertical pivot 100 for connecting the forks 102A, 102B along the axis D-D'.

The forks 102A, 102B can pivot relative to one another around the pivot 104, without moving along the axis D-D'.

The first fork 102A advantageously has a first region 105A for receiving the pivot 104, extending substantially perpendicular to the axis D-D', and a support arm 105B substantially perpendicular or inclined relative to the first region 105A.

The movement means 96 include at least one first connecting rod 106A, advantageously a pair of first connecting rods 106A intended to connect the hinge 94 to the first fastening region 90A. They include a second connecting rod 106B for connecting the hinge 94 to the second fastening region 90B.

Each first connecting rod 106A is hinged at a first point 108A on the first region 90A and a second point 110A on the hinge 94. In the example shown in FIG. 1, the second hinge points 110A of the respective connecting rods 106 are respectively situated in the connecting area between the first region 105A and the arm 105B and at the end of the arm 105B connected to the upper connecting rod 106A.

In this example, the first connecting rods 106A are mounted parallel to one another forming a parallelogram structure. The parallelogram thus formed has the hinge points 108A, 110A of the connecting rods 106A as apices.

The hinge of each connecting rod 106A at the first point 108A and the second point 110A is formed by pivots perpendicular to the axis D-D'.

The second connecting rod 106B is hinged at a first point 108B on the second region 90B and a second point 110B on the hinge 94, advantageously at the end of the second fork 102B opposite the hinge 94. The articulation of the connecting rod 106B to the first point 108B and the second point 110B is formed by pivots perpendicular to the axis D-D'.

The blocking means 98 include at least one stop 112A, 112B secured to the movement means 96, and at least one complimentary stop 114A, 114B secured to a fastening region 90A, 90B.

In the example illustrated in the figures, the blocking means 98 include stops 112A, 112B, respectively formed at the free ends of the connecting rods 106A, 106B, and for each stop 112A, 112B, a respective complementary stop 114A, 114B respectively formed on the fastening regions 90A, 90B situated opposite the free ends of the connecting rods 106A, 106B.

The stops 112A, 112B and the complementary stops 114A, 114B can cooperate beyond a given angular position of each connecting rod 106A, 106B around the first point 108A, 108B to prevent the rotation of the connecting rod 106A, 106B beyond that angular position.

When the maintenance assembly 60 is active, before the frangible connection 72 is broken, the hinge and movement assembly 62 occupies a contracted maintenance configuration, illustrated by FIG. 3.

In this configuration, the first fastening region 90A is situated close to the second fastening region 90B, on either side of the axis D-D' of the hinge 94. The first region 105A of the first fork 102A, and the second fork 102B extend substantially particular to the axis D-D', horizontally in FIG. 3.

Each first connecting rod 106A protrudes from a first side, for example downward, from the hinge point 110A thereof on the fork 102A. Each first connecting rod 106A is in particular inclined relative to the axis D-D'.

The second connecting rod 106B protrudes from another side relative to the hinge point 110B thereof on the fork 102B, for example upwards.

Once the frangible connection 72 is broken, the hinge and movement assembly 62 can go into a separated configuration illustrated by FIG. 4.

The movement means 96 are free to move the second fastening region 90B relative to the first fastening region 90A following a composite movement including at least a first movement along the axis D-D' and, advantageously, a second movement perpendicular to the axis D-D'.

Each connecting rod 106A, 106B is capable of pivoting around the first point 108A, 108B until each stop 112A, 112B comes into contact with a complementary stop 114A, 114B.

In the separated configuration, shown in FIG. 4, the second region 90B has moved away from the first region 90A by means of the movement means 96, following the composite movement described above.

In this configuration, the connecting rods 106A, 106B are aligned or parallel to one another. They advantageously extend perpendicular to the axis D-D'. The connecting rod 106B is aligned with and in the extension of the fork 102B, as the presence of a second hinge and movement assembly 62 between the portions 46A and 48A prevents the rotation of the connecting rod 106B around the hinge point 110B from continuing.

The axis D-D' is kept vertical all throughout the movement of the releasable portion 48A relative to the stationary portion 46A as far as the separated configuration owing to the hinge and movement assembly 62 and the blocking means 98. This allows each releasable portion 48A, 48B to pivot around the axis D-D'.

The second region 90B has moved vertically and horizontally away from the first region 90A, in particular by moving downward and toward the central axis A-A'.

In reference to FIG. 7, the deformable connecting assembly 64 is formed by springs 120 positioned perpendicular to the axis D-D' between the lower stationary portion 46B and the lower releasable portion 48B. These springs 120 can be deformed with a substantially zero return force during pivoting of the releasable portions 48A, 48B around the axis D-D'.

The operation of the separating assembly 16 according to the invention will now be described.

Initially, when idle, each partition 22 is in the configuration thereof blocking the passage 20, as illustrated in FIG. 1.

In this configuration, each releasable maintenance assembly 60 is active. The frangible connection 72 keeps the first piece 70A in contact with the second piece 70B. The releasable portions 48A, 48B are kept in position against stationary portions 46A, 46B.

In this configuration, each hinge and movement assembly 62 is in the contracted configuration thereof. The fastening regions 90A, 90B are situated facing one another, close to one another.

The deformable springs 120 are initially stressed in order to keep the lower stationary portion 46B in position with the lower releasable portion 48B.

During normal operation, when an occupant of the aircraft 10 wishes to unblock the passage 20, he actuates the locking assembly 25 to release the movable partition 22.

The movement mechanism 24 then moves each movable partition 22 to retract it into a stationary partition 18. This movement is advantageously done in the transverse plane P (FIG. 2) of the stationary partition 18.

To that end, the lower panel 42 moves along the horizontal axis C-C' to enter the receiving housing 36. The upper panel 40 moves through a combined outward transverse translational and vertical translational movement relative to the lower panel 42, to receive the lower panel 42 in the retraction housing 52 and to retract into the receiving housing 36 formed in the stationary partition 18.

In case of emergency, if the movable partition 22 is in the configuration thereof blocking the passage 20 and the passage 20 must be freed, the user applies an axial force on the panel 48A greater than the given value, for example greater than 20 kg. To that end, he may strike the upper panel 40 at the upper releasable portion 48A thereof.

This axial force causes traction greater than the calibrated pulling force on the connection 72. Subsequently, the frangible connection 72 breaks, in particular by breaking the fastening member 80 at the thin zone 84.

The second piece 70B secured to the releasable portion 48A is therefore free to move relative to the first piece 70A secured on the stationary portion 46A.

The weight of the upper releasable portion 48A gravitationally drives it downward. This causes the deployment of each hinge and movement assembly 62.

The connecting rods 106A, 106B pivot around their hinge point 110A, 110B; 108A, 108B. This movement causes a composite movement of the upper releasable portion 48A downward in a direction parallel to the axis D-D' and following a movement perpendicular to the axis D-D' away from the stationary portion 46A.

As illustrated by FIG. 7, this composite movement lowers the upper releasable portion 48A relative to the lower releasable portion 48B. The upper edge of the upper releasable portion 48A then moves away from the fuselage 12, as illustrated by FIG. 7.

Figure 9:
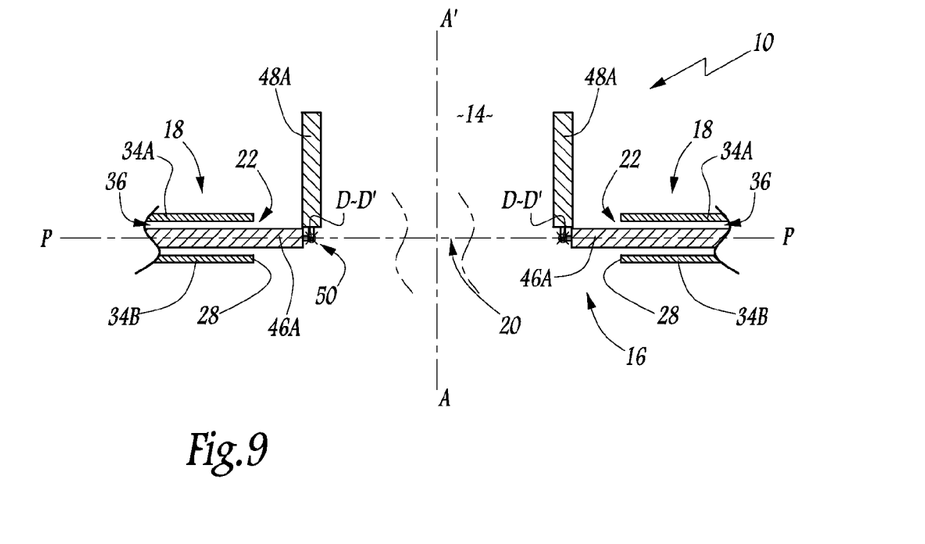
FIG. 9 is a view similar to FIG. 2, illustrating the partial clearing of the circulation passage, when the releasable portions of two opposite movable partitions have pivoted.

Then, the user pivot the inner half-panel 54 formed by the releasable portions 48A, 48B relative to the outer half-panel 56 formed by the stationary portions 46A, 46B as illustrated by FIG. 8. This pivoting drives the half-panel 54 around the axis D-D' relative to the half-panel 56. This partially frees the passage 20, as shown in FIG. 9.

Given the width of each half-panel 54, a substantial passage, for example with a width substantially equal to 50 cm, is obtained.

Furthermore, the upper releasable portion 48A having moved downward by means of each hinge and movement assembly 62, the movement of the inner half-panel 54 is not hindered by the fuselage 12, even if the latter has a small curve radius.

The releasable hinge mechanism 50 according to the invention is therefore particularly simple to use, in particular in case of emergency. It has a structure that is easy to manufacture and reliable. Once broken, the frangible connection 72 can be replaced by simply substituting the fastening member 80.

Furthermore, the stiffness of each movable partition 22 is reinforced by the presence of the maintenance assembly 60. The hinge mechanism 50 is also very light, due to its simplicity.

It will be noted that lowering the releasable portion 48A along the axis D-D', and the lateral movement thereof relative to the stationary portion 46A and the pivoting thereof around the axis D-D' using hinges 94 to free the passage 20, can be done almost simultaneously, which reduces the time necessary to evacuate the aircraft 10.

In one alternative, the movement means 96 of the hinge and movement assembly 62 allow the second fastening region 90B to move relative to the first fastening region 90A exclusively along the axis D-D' in translation, without translation perpendicular to the axis D-D'.

In another alternative, the frangible hinge mechanism 50 is mounted between a releasable portion and a stationary portion of a partition of the aircraft that is not necessarily a movable leaf.

Figure 10:
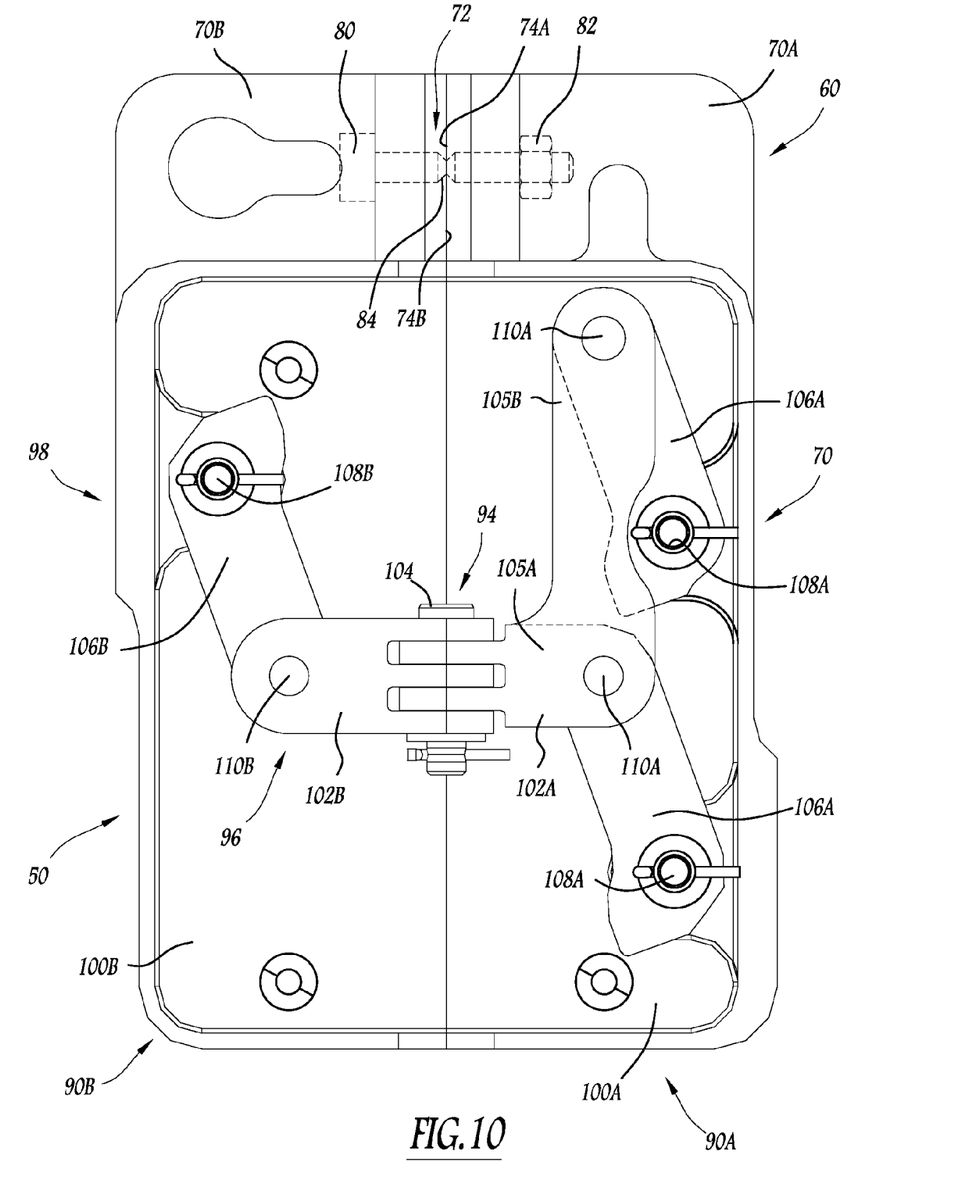
FIG. 10 is a view similar to FIG. 4, of an alternative of the frangible hinge mechanism.

In one alternative mechanism 50, shown in FIG. 10, the maintenance assembly 60 is mounted on the hinge assembly 62. It is for example located in contact with platens 100A, 100B above and/or below them.

In this example, the first piece 70A is secured to the first platen 100A and the second piece 70B is secured to the second platen 100B. As previously described, the connecting member 80 of the frangible connection 72 is introduced between the first piece 70A and the second piece 70B and is maintained by a retaining member 82.

The thin zone 84 is advantageously located at the interstice between the first platen 100A and the second platen 100B.

The operation of this alternative mechanism 50 is also similar to that of the mechanism shown in FIGS. 1 to 9.

In still another alternative (not shown), the maintenance assembly 60 is mounted directly on the hinge 94 of the hinge assembly 62. It is for example formed by a frangible disc or a frangible stop inserted between the forks 102A, 102B.

In one alternative, the mechanism 50 may comprise a single first connecting rod 106A and a single second connecting rod 106B.

The invention claimed is:

1. A frangible hinge mechanism for a partition of a platform, comprising:
    a hinge and movement assembly comprising a first fastening region for fastening on a stationary portion of the partition, a second fastening region for fastening on a releasable portion of the partition, and a hinge connecting the first fastening region to the second fastening region, the hinge defining an axis of rotation of the second fastening region relative to the first fastening region; and a maintenance assembly for maintaining the releasable portion of the partition relative to the stationary portion of the partition, the maintenance assembly comprising at least one frangible connection that may be broken to rotatably release the second fastening region relative to the first fastening region, wherein the hinge and movement assembly comprises a guide for the relative movement of the second fastening region relative to the first fastening region at least in a direction parallel to the axis of rotation.

2. The mechanism according to claim 1, wherein the guide can allow movement of the second fastening region relative to the first fastening region along an axis perpendicular to the axis of rotation, so as to move the second fastening region away from the first fastening region.

3. The mechanism according to claim 1, wherein the guide is configured to guide the movement of the second fastening region relative to the first fastening region between a maintenance configuration and a separated configuration, the hinge and movement assembly comprising a block for blocking the movement of the second fastening region relative to the first fastening region in the separated configuration.

4. The mechanism according to claim 3, wherein in the separated configuration, the second fastening region extends in a position situated at least partially below the position that second fastening region occupies in the maintenance configuration.

5. The mechanism according to claim 1, wherein the guide comprises at least one first connecting rod, each first connecting rod connecting one of the first fastening region and the second fastening region to the hinge, the first connecting rod being hinged at the first point on one of the first fastening region and the second fastening region, and a second point on the hinge.

6. The mechanism according to claim 5 comprising at least one second connecting rod connecting the other of the first fastening region and the second fastening region to the hinge, the second connecting rod being hinged at a first point on the other of the first fastening region and the second fastening region, and a second point on hinge.

7. The mechanism according to claim 6, wherein the second fastening region is movable relative to the first fastening region between a maintenance configuration and a separated configuration, and in that, in the separated configuration, the or each first connecting rod and the second connecting rod are parallel or aligned.

8. The mechanism according to claim 6, wherein the second fastening region is movable relative to the first fastening region between a maintenance configuration and a separated configuration, and in that, in the separated configuration, the or each first connecting rod and the second connecting rod are along an axis perpendicular to the axis of rotation.

9. The mechanism according to claim 1, wherein the frangible maintenance assembly comprises a first part configured to be fastened on the stationary portion and a second part configured to be fastened on the releasable portion.

10. The mechanism according to claim 9, wherein the frangible connection comprises a frangible fastening member connecting the first part and the second part.

11. The mechanism according to claim 1, wherein the frangible connection can be broken by applying a calibrated pulling force.

12. A platform partition comprising a stationary portion, a releasable portion relative to the stationary portion, and a mechanism according to claim 1, the first fastening region being fastened on the stationary portion, the second fastening region being fastened on the releasable portion, the frangible maintenance assembly connecting the stationary portion to the releasable portion.

13. The partition according to claim 12, wherein after the frangible connection is broken, the releasable portion can be moved downward relative to the stationary portion by means of the guide.

14. The partition according to claim 12 comprising an additional releasable portion, the releasable portion being able to slide relative to the additional releasable portion parallel to the axis of rotation after the frangible connection is broken.

15. A separating assembly for a platform, of the type having a stationary partition delimiting a circulation passage extending along a circulation axis and at least one partition transversely movable relative to the circulation axis between a configuration freeing the passage and a configuration blocking the passage, the movable partition being according to claim 12.

16. A separating assembly for a platform comprising a first stationary partition and a second stationary partition situated on either side of a circulation passage, the assembly comprising a first movable partition that can be transversely moved relative to the first stationary partition and a second movable partition that can be transversely moved relative to the second stationary partition between a configuration freeing the passage and a configuration blocking the passage, at least one movable partition being according to claim 12.

17. A separating assembly for a platform comprising a first stationary partition and a second stationary partition situated on either side of a circulation passage, the assembly comprising a first movable partition that can be transversely moved relative to the first stationary partition and a second movable partition that can be transversely moved relative to the second stationary partition between a configuration freeing the passage and a configuration blocking the passage, both movable partition being according to claim 12.

18. A method for opening a platform partition, comprising:
providing a partition according to claim 12;
breaking the frangible connection to release the releasable portion relative to the stationary portion;
moving the releasable portion relative to the stationary portion in at least one direction parallel to the axis of rotation by means of the guide; and
pivoting the releasable portion relative to the stationary portion around the axis of rotation.

19. The mechanism according to claim 1, wherein the guide comprises a pair of first connecting rods.

* * * * *